E. G. BUCHMANN.
PROCESS OF MANUFACTURING A COMPOSITE FABRIC.
APPLICATION FILED JAN. 9, 1918.

1,355,534. Patented Oct. 12, 1920.

Inventor
Edward G. Buchmann

Witness:
Robert Weber

By Geo. W. Young,
Attorney

UNITED STATES PATENT OFFICE.

EDWARD G. BUCHMANN, OF CHICAGO, ILLINOIS.

PROCESS OF MANUFACTURING A COMPOSITE FABRIC.

1,355,534.   Specification of Letters Patent.   Patented Oct. 12, 1920.

Application filed January 9, 1918. Serial No. 210,956.

*To all whom it may concern:*

Be it known that I, EDWARD G. BUCHMANN, a citizen of the United States, and resident of Chicago, in the county of Cook and State of Illinois, have invented certain new and useful Improvements in Processes of Manufacturing a Composite Fabric; and I do hereby declare that the following is a full, clear, and exact description thereof.

My invention relates to new and useful improvements in the process of manufacturing fabric for use in the making of automobile and similar vehicle tires.

It is the primary object of this invention to produce a tire fabric by a simple and inexpensive process, which fabric will be much stronger, more lasting and of greater shock absorbing qualities than fabric at present in use.

With this general object in view the invention resides in the novel process which will be hereinafter more particularly described and claimed.

Figure 1:
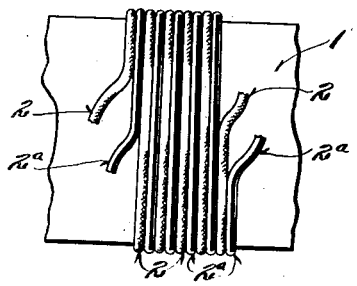
Figure 1 represents a plan view of a partially completed fabric strip constructed in accordance with the invention.

Referring more particularly to the drawing, it will be noticed that the numeral 1 denotes a thin strip of raw rubber which forms the body or base of my improved fabric, and that the same is incased within the threaded mesh 2, the same being preferably formed by a single thread or cord wound about the strip. The strand 2 may be of cotton or any suitable fibrous material and may be either wound about the strip 1 as shown in Fig. 1 or obliquely, or any other form or manner of placing the same about the body may be used, the essential feature of the invention being the provision of a central body strip of rubber surrounded by fibrous strands.

In the present instance the strand 2 has its coils spaced apart to receive therein coils of a second strand 2ª made of rubber which can be vulcanized so as to form a part of the base strip 1. In other words the strand of rubber produces a filler between the fabric strands.

Figure 2:
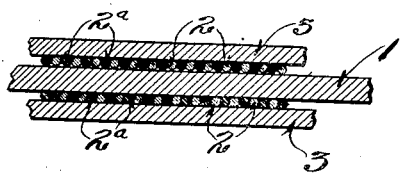
Fig. 2 is a longitudinal sectional view through the fabric before the same is vulcanized.
Figure 3:
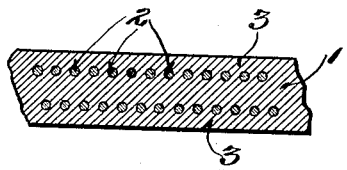
Fig. 3 is a similar view after the vulcanization has taken place.

Another step in the process of forming the fabric strip consists in disposing cover strips 3 above and below the strand incased body strip 1, as shown in Fig. 2. After this the several parts are vulcanized to provide a homogeneous strip of indeterminate length and of a suitable width which can be readily used as ordinary fabric strips are used in the formation of vehicle tires. By providing the strand 2ª of rubber between the coils of the strand 2, a more perfect vulcanization between the body and cover strips 1 and 3 respectively is procured, and this not only increases the life of the fabric, but also adds greatly to its resiliency.

Such a fabric as has been described can be very readily manufactured with machinery now known in the art as, for example, the body strip may be taken from the coil and incidental to its travel, it can be incased with the fiber and rubber windings and thereafter the outer cover strips can be run over reels and associated with the wound body strip. After this the mass can be compressed between rollers and fed to a suitable vulcanizer.

I claim:

That method of manufacturing a composite material, which consists in winding alternate fiber and rubber threads about a body of soft rubber, thereafter placing covering sheets of soft rubber upon the threaded surfaces of the body strip and then pressing the several layers together.

In testimony that I claim the foregoing I have hereunto set my hand at Chicago, in the county of Cook and State of Illinois.

EDWARD G. BUCHMANN.